United States Patent
Miya et al.

[11] Patent Number: 5,977,206
[45] Date of Patent: Nov. 2, 1999

[54] POLYCARBONATE RESIN COMPOSITION

[75] Inventors: Shinya Miya; Satoshi Kanayama; Ken Shimomai, all of Hiratsuka, Japan

[73] Assignee: Mitsubishi Engineering-Plastics Corp., Japan

[21] Appl. No.: 09/006,001

[22] Filed: Jan. 12, 1998

Related U.S. Application Data

[63] Continuation of application No. 08/676,742, Jul. 8, 1996, abandoned.

[30] Foreign Application Priority Data

| Jul. 12, 1995 | [JP] | Japan | 7-176248 |
| Jul. 26, 1995 | [JP] | Japan | 7-190657 |
| Sep. 20, 1995 | [JP] | Japan | 7-241546 |
| Nov. 28, 1995 | [JP] | Japan | 7-309211 |
| Nov. 28, 1995 | [JP] | Japan | 7-309212 |
| Feb. 23, 1996 | [JP] | Japan | 8-36344 |
| Mar. 19, 1996 | [JP] | Japan | 8-62615 |

[51] Int. Cl.⁶ ............... C08G 69/00; C08K 5/06
[52] U.S. Cl. ............... 523/136; 524/108
[58] Field of Search ............... 523/136; 524/108

[56] References Cited

U.S. PATENT DOCUMENTS

| 4,904,710 | 2/1990 | Nace | 523/137 |
| 4,965,303 | 10/1990 | Kishimoto | 524/108 |
| 5,006,572 | 4/1991 | Lundy | 523/136 |
| 5,187,211 | 2/1993 | Lundy | 524/107 |
| 5,280,050 | 1/1994 | Powell | 523/136 |
| 5,382,605 | 1/1995 | Powell | 523/136 |
| 5,476,893 | 12/1995 | Lundy | 523/136 |

FOREIGN PATENT DOCUMENTS

| 664 316 | 7/1995 | European Pat. Off. |
| 2-132147 | 5/1990 | Japan |

*Primary Examiner*—David Buttner
*Attorney, Agent, or Firm*—Parkhurst & Wendel, L.L.P.

[57] ABSTRACT

A polycarbonate resin composition according to the present invention is suited to be used for medical supplies or appliances and shows a very low yellow discoloration when exposed to an ionizing radiation for sterilization. The polycarbonate resin composition comprises 100 parts by weight of a polycarbonate resin; 0.01 to 5 parts by weight of an aromatic compound containing oxy group or carbonyl group; and 0.01 to 5 parts by weight of at least one compound selected from the group consisting of: (A) a compound containing cyclic acetal group; (B) a sulfone compound; (C) a sulfoxide compound; (D) polyalkylene glycol, an ether of polyalkylene glycol or an ester of polyalkylene glycol; (E) a compound containing sulfonate group; and (F) an aromatic hydrocarbon-aldehyde resin.

5 Claims, No Drawings

POLYCARBONATE RESIN COMPOSITION

This is a Continuation of application Ser. No. 08/676,742 filed Jul. 8, 1996 now abandoned.

BACKGROUND OF THE INVENTION

The present invention relates to a polycarbonate resin composition, and more particularly it relates to a polycarbonate resin composition having an excellent resistance to an ionizing radiation, which exhibits a low discoloration without deterioration in properties thereof when exposed to the ionizing radiation for sterilization.

Polycarbonate resins have been widely utilized in the fields of medical supplies and appliances because the polycarbonate resin have excellent mechanical strength, impact resistance, heat resistance and transparency as well as a high safety. The medical supplies and appliances are generally sterilized upon use. Specifically, the sterilization of these medical supplies and appliances has been carried out by a high-pressure steam sterilization process, an ethyleneoxide gas (EOG) sterilization process, or a sterilization process using an ionizing radiation such as a gamma radiation or an electron beam. Among these sterilization processes, the high-pressure steam sterilization process has disadvantages such as high energy cost and necessity of a drying step after the sterilization. Similarly, the EOG sterilization process has posed such problems as toxicity of ethyleneoxide itself or environmental pollution upon disposal thereof. Under these circumstances, a recent tendency is such that the sterilization process using an ionizing radiation, generally a gamma radiation has been predominately adopted because the sterilization process is relatively inexpensive and can be performed at a low temperature in a dry condition.

However, there also is such a problem that the polycarbonate resin suffers from yellow discoloration when exposed to the ionizing radiation for sterilization thereof. This results in considerable deterioration in value of the products, especially when the polycarbonate resin is applied to the medical supplies or appliances.

As means for solving these problems, there have been proposed a method in which a halogen-containing polycarbonate resin is used (Japanese Patent Application Laid-open (Kokai) No. 2-55062 (1990)), a method in which a brominated phthalic acid derivative is blended (Japanese Patent Application Laid-open (Kokai) No. 5-179127 (1993)), or the like. However, in these methods, metal corrosion is likely to generate due to the inclusion of halogen in the resin compositions, so that a molding machine or the like therefor are required to be formed from special metal material having a corrosion resistance.

In order to solve the afore-mentioned problems such as yellow discoloration or the like, there have been also proposed a method in which thio-alcohols are used (Japanese Patent Application Laid-open (Kokai) No. 1-229052 (1989)), a method in which thio-ethers are used (Japanese Patent Application Laid-open (Kokai) No. 2-115260 (1990)), a method in which compounds having a mercapto group are used (Japanese Patent Application Laid-open (Kokai) Nos. 2-49058 (1990), 4-36343 (1992) and 6-166807 (1994)), a method in which polyalkylene-oxide and an aromatic compound having a sulfonate group are used in combination (Japanese Patent Application Laid-open (Kokai) No. 5-209120 (1993)), and a method in which compounds having a sulfide group are used (Japanese Patent Application Laid-open (Kokai) No. 6-93192 (1994) and 6-248170 (1994)). However, in these methods, there still exist such problems that the yellow discoloration cannot be sufficiently prevented, or deteriorated environmental conditions occurs due to generation of malodor upon forming, or the like.

Furthermore, in order to solve the afore-mentioned problems, Japanese Patent Application Laid-open publication (Kokai) No. 61-215651 (1998) discloses a method in which boron compounds are used, Japanese Patent Application Laid-open (Kokai) No. 62-135556 (1987) discloses a method in which polyether-polyol or an alkyl ether thereof are used, Japanese Patent Application Laid-open (Kokai) Nos. 64-22959 (1989) and 1-161050 (1989) disclose a method in which polyether-polyol protected by particular terminal groups are used, Japanese Patent Application Laid-open publication (Kokai) Nos. 1-270869 (1989) and 2-13460 (1990)) disclose a method in which polypropylene glycol is used, Japanese Patent Application Laid-open (Kokai) No. 2-232258 (1990) discloses a method in which benzyl alcohol derivatives are used, and Japanese Patent Application Laid-open (Kokai) No. 2-132147 (1990) discloses a method in which itaconic acid, benzaldehyde-dimethylacetal, benzaldehyde-propyleneglycolacetal, etc. are used. However, these methods have also posed such problems that the yellow discoloration cannot be sufficiently prevented or otherwise, if the amounts of the compounds used therein increases to an extent enough in order to prevent the yellow discoloration, the other properties of the polycarbonate resin compositions are adversely affected.

In view of these problems encountered in the prior arts, a polycarbonate resin composition which is capable of exhibiting little deterioration of the inherent properties thereof, little generation of malodor upon forming and little generation of the yellow discoloration upon irradiation of an ionizing radiation for sterilization are strongly demanded.

As a result of the present inventors' intense studies for solving the afore-mentioned problems, it has been found that by blending an oxy group- or a carbonyl group-containing aromatic compound and a specific compound are blended with a polycarbonate resin at specified blending ratios, the obtained polycarbonate resin composition not only maintains inherent properties of polycarbonate resin without deterioration but also prevents generation of yellow discoloration upon sterilization using an ionizing radiation. The present invention has been achieved on the basis of the findings.

SUMMARY OF THE INVENTION

It is an object of the present invention to provide a polycarbonate resin composition which is suited to use for medical supplies or appliances and shows a very low yellow discoloration when exposed to an ionizing radiation for sterilization, while preventing deterioration of inherent properties thereof.

To accomplish the aims, in an aspect of the present invention, there is provided a polycarbonate resin composition comprising 100 parts by weight of a polycarbonate resin; 0.01 to 5 parts by weight of an oxy aromatic compound containing oxy group or carbonyl group; and 0.01 to 5 parts by weight of at least one compound selected from the group consisting of: (A) a compound containing cyclic acetal group; (B) a sulfone compound; (C) a sulfoxide compound; (D) polyalkylene glycol, an ether of polyalkylene glycol or an ester of polyalkylene glycol; (E) a compound containing sulfonate group; and (F) an aromatic hydrocarbon-aldehyde resin.

In a second aspect of the present invention, there is provided a polycarbonate resin composition comprising 100 parts by weight of a polycarbonate resin; 0.01 to 5 parts by weight of an aromatic compound containing oxy group or carbonyl group; 0.01 to 5 parts by weight of a compound containing cyclic acetal group; and 0.01 to 5% by weight of polyalkylene glycol, an ether of polyalkylene glycol or an ester of polyalkylene glycol.

DETAILED DESCRIPTION OF THE INVENTION

The present invention is described in detail below.

The polycarbonate resin used in the composition according to the present invention may be homopolymers or copolymers of a linear or branched thermoplastic aromatic polycarbonate prepared by reacting an aromatic dihydroxy compound or a mixture of the aromatic dihydroxy compound and a small amount of a polyhydroxy compound with phosgene or diester of carbonic acid.

As the aromatic dihydroxy compounds, bis(hydroxyaryl) alkanes such as 2, 2-bis(4-hydroxyphenyl)propane (=bisphenol A), 2, 2-bis(3, 5-dibromo-4-hydroxyphenyl) propane (=tetrabromo-bisphenol A), bis(4-hydroxyphenyl) methane, 1, 1-bis(4-hydroxyphenyl)ethane, 2, 2-bis(4-hydroxyphenyl)butane, 2, 2-bis(4-hydroxyphenyl)octane, 2, 2-bis(4-hydroxy-3-methylphenyl)propane, 1, 1-bis(3-t-butyl-4-hydroxyphenyl)propane, 2, 2-bis(4-hydroxy-3, 5-dimethylphenyl)propane, 2, 2-bis(3-bromo-4-hydroxyphenyl)propane, 2, 2-bis(3, 5-dichloro-4-hydroxyphenyl)propane, 2, 2-bis(3-phenyl-4-hydroxyphenyl)propane, 2, 2-bis(3-cyclohexyl-4-hydroxyphenyl)propane, 1, 1-bis(4-hydroxyphenyl)-1-phenyl ethane or bis(4-hydroxyphenyl)diphenylmethane; bis(hydroxyaryl)cycloalkanes such as 1, 1-bis(4-hydroxyphenyl)cyclopentane or 1, 1-bis( 4-hydroxyphenyl) cyclohexane; dihydroxy-diaryl ethers such as 4, 4'-dihydroxy-diphenyl ether or 4, 4'-dihydroxy-3, 3'-dimethyl-diphenyl ether; dihydroxy-diaryl sulfides such as 4, 4'-dihydroxy-diphenyl sulfide or 4, 4'-dihydroxy-3, 3'-dimethyldiphenyl sulfide; dihydroxy-diaryl sulfoxides such as 4, 4'-dihydroxy-diphenyl sulfoxide or 4, 4'-dihydroxy-3, 3'-dimethyldiphenyl sulfoxide; dihydroxy-diaryl sulfones such as 4, 4'-dihydroxy-diphenyl sulfone or 4, 4'-dihydroxy-3, 3'-dimethyldiphenyl sulfone; hydroquinone; resorcin; 4, 4'-dihydroxy-diphenyl; or the like may be exemplified. These aromatic dihydroxy compounds may be used singly or in the form of the mixture thereof. Among them, 2, 2-bis(4-hydroxyphenyl)propane is preferred.

In addition, branched polycarbonate resins can be obtained by using a polyhydroxy compound such as fluoroglucine, 2, 6-dimethyl-2, 4, 6-tri(4-hydroxyphenyl)-3-heptene, 4, 6-dimethyl-2, 4, 6-tri(4-hydroxyphenyl)-2-heptene, 1, 3, 5-tri(2-hydroxyphenyl)benzole, 1, 1, 1-tri(4-hydroxyphenyl)ethane, 2, 6-bis(2-hydroxy-5-methylbenzyl)-4-methylphenol or a, a', a"-tri(4-hydroxyphenyl)-1, 3, 5-triisopropylbenzene; 3, 3-bis(4-hydroxyaryl)-oxindole (=isatin-bisphenol); 5-chloroisatin-bisphenol; 5, 7-dichloroisatin-bisphenol; 5-bromoisatin-bisphenol; or the like.

In the case where the polycarbonate resin is prepared according to a phosgene method, the reaction may be carried out in the presence of a terminator or a molecular weight modifier. Specific examples of the terminators or molecular weight modifiers may include phenol, p-t-butyl phenol or tribromophenol, a long-chain alkylphenol, aliphatic carboxylic acid chloride, aliphatic carboxylic acid, hydroxybenzoic acid alkyl ester, alkylether-phenol or the like. In the preparation of the polycarbonate resin used in the present invention, these terminators or molecular weight modifiers can be used singly or in the form of the mixture thereof.

The polycarbonate resin used in the present invention has a viscosity-average molecular weight of 10,000 to 100,000, preferably 15,000 to 50,000 calculated from the solution viscosity measured at 25° C. in terms of a solution viscosity using methylene chloride as a solvent.

The oxy group- or a carbonyl group-containing aromatic compounds used in the composition according to the present invention, are represented by the following general formula (I) or (II):

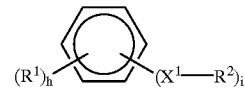

(I)

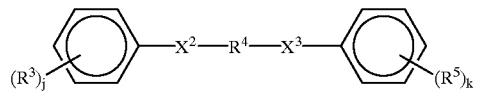

(II)

where $R^1$, $R^3$ and $R^5$ are independently a $(C_1-C_{10})$alkyl group, a $(C_1-C_{10})$alkoxy group, a $(C_1-C_{10})$alkoxy$(C_1-C_{10})$ alkyl group, a $(C_6-C_{15})$aryl$(C_1-C_{10})$alkoxy$(C_1-C_{10})$alkyl group, —$CH_2OH$ or a halogen atom; $R^4$ is a $(C_1-C_{15})$ alkylene group, a $(C_2-C_{15})$alkenylene group, a $(C_6-C_{30})$ arylene group, a $(C_1-C_{15})$alkylene-dioxy group, or a $(C_6-C_{30})$arylene-di$(C_1-C_{15})$alkylene-oxy group in which the said arylene group or the said arylene-dialkylene-oxy group may have substituent group(s) bonded to the aromatic ring thereof, the substituent group(s) being a $(C_1-C_{10})$alkyl group or a halogen atom; $X^1$, $X^2$ and $X^3$ are independently —O—, —$CHR^6$—O—, —CO—, —$CHR^7$—CO—, —CO—CO— or —CO—$C(OR^8)_2$—; $R^2$ $R^6$, $R^7$ and $R^8$ are independently a hydrogen atom, a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, a hydroxy group, a $(C_1-C_{30})$alkoxy group, a $(C_6-C_{30})$aryl $(C_1-C_{30})$alkoxy group, a $(C_6-C_{30})$aryl $(C_1-C_{30})$alkyl $(C_1-C_{30})$alkoxy group, a $(C_1-C_{30})$acyl group or a $(C_6-C_{30})$aryl$(C_1-C_{30})$acyl group in which the said aryl group, the said arylalkyl group, the said arylalkenyl group, the said arylalkoxy group, the said arylalkylalkoxy group or the said arylacyl group may have substituent group(s) bonded to the aromatic ring thereof, the substituent group(s) being a $(C_1-C_{10})$alkyl group or a halogen atom; and h, j and k are independently an integer of 0 to 5 and i is an integer of 1 to 6 with provided that a sum of h and i is in the range of 1 to 6, and if i is an integer not less than 2, the $R^2$'s contained in the substituent groups bonded to the same aromatic ring may be covalently bonded with each other.

The aromatic compound containing oxy group or carbonyl groups may be used singly or in the form of the mixture thereof.

Specific examples of the aromatic compound containing oxy group or carbonyl groups represented by the general formula (I) may include diphenyl ether, arylphenyl ether, dibenzyl ether, benzylmethyl ether, benzylphenyl ether, benzylnaphthyl ether, 1, 4-benzodioxane, 1, 2-methylenedioxybenzene, piperonyl alcohol, benzophenone, dibenzyl ketone, benzylmethyl ketone, benzylphenyl ketone, benzyltolyl ketone, benzylnaphthyl ketone, dibenzoyl, benzoyl cyclobutane, benzoyl propane, benzoin, benzoin-ethyl-ether, 1, 2-dibenzoyl benzene, 1, 4-bis-methoxymethyl benzene, phenyl acetate-benzyl ester, benzyl benzoate, phthalic acid-benzylbutyl ester, dicyclohexyl phthalate, benzyldimethyl ketal, or the like.

Specific examples of the aromatic compound containing oxy group or carbonyl groups represented by the general formula (II) may include dibenzoyl methane, dibenzoyl propane, 1, 2-dibenzyloxy ethane, hydroquinone-dibenzyl ether, ethylene glycol dibenzoate, or the like.

The blending amount of the aromatic compound containing oxy group or carbonyl group is in the range of 0.01 to 5 parts by weight based on 100 parts by weight of the polycarbonate resin. If the blending amount of the aromatic compound containing oxy group or carbonyl group is less than 0.01 part by weight, the aimed effect of preventing yellow discoloration upon exposure to an ionizing radiation cannot be sufficiently achieved. On the other hand, if the blending amount of the aromatic compound containing oxy group or carbonyl group is more than 5 parts by weight, the mechanical properties of the resultant polycarbonate resin composition are deteriorated. In order to attain both the effect of preventing the yellow discoloration and the deterioration of the mechanical properties under well-balanced conditions, the blending amount of the aromatic compound containing oxy group or carbonyl group is preferably in the range of 0.05 to 3 parts by weight based on 100 parts by weight of the polycarbonate resin.

(A): The compounds containing cyclic acetal groups used in the composition according to the present invention, are represented by the following formula (III) or (IV):

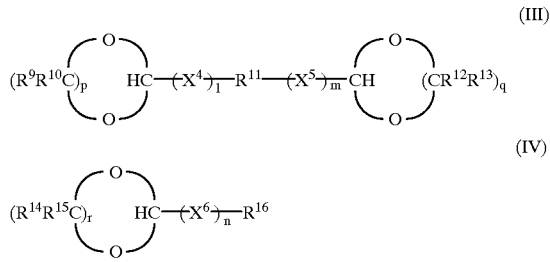

where $R^9$, $R^{10}$, $R^{12}$, $R^{13}$, $R^{14}$ and $R^{15}$ are independently a hydrogen atom, a $(C_1-C_{10})$alkyl group, $-CH_2OH$, $-COOCH_3$, a phenyl group or a halogen atom; $R^{11}$ is a $(C_1-C_{15})$alkylene group, a $(C_2-C_{15})$alkenylene group or a $(C_6-C_{30})$arylene group, in which the said arylene group may have substituent group(s) bonded to the aromatic ring thereof, the substituent group(s) being a $(C_1-C_{10})$alkyl group or a halogen atom; $R^{16}$ is a hydrogen atom, a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, a $(C_1-C_{30})$alkoxy$(C_1-C_{30})$alkyl group, a $(C_1-C_{30})$acyl group, a $(C_6-C_{30})$aryl$(C_1-C_{30})$acyl group, a halogen atom, a halogenated $(C_1-C_{30})$alkyl group, an amino group or an amino$(C_1-C_{30})$alkyl group, in which the said aryl group, the said arylalkyl group, the said arylalkenyl group or the said arylacyl group may have substituent group(s) bonded to the aromatic ring thereof, the substituent group(s) being a $(C_1-C_{10})$alkyl group or a halogen atom; $X^4$, $X^5$ and $X^6$ are independently $-CHR^{17}-$, $-O-$, $-NH-$ or $-PH-$ where $R^{17}$ is a hydrogen atom, a$(C_1-C_{15})$alkyl group or a $(C_6-C_{30})$aryl group; and l, m and n are independently an integer of 0 or 1; and p, q and r are independently an integer of 1 to 10, and if p, q or r is not less than 2, the two or more of each of $R^9$, $R^{10}$, $R^{12}$ and $R^{13}$ in the general formula (III), and $R^{14}$ and $R^{15}$ in the general formula (IV) may be the same or different.

These compound containing cyclic acetal groups may be used singly or in the form of the mixture thereof.

Specific examples of the compound containing cyclic acetal groups represented by the general formula (III) may include 2, 2'-ethylene-bis-1, 3-dioxolane, 2, 2'-trimethylene-bis-1, 3-dioxolane, 2, 2'-phenylene-bis-1, 3-dioxolane, or the like.

Specific examples of the compound containing cyclic acetal groups represented by the general formula (IV) may include 1,3-dioxolane, 2-methyl-1, 3-dioxolane, 2-methyl-4-methyl-1, 3-dioxolane, 2-pentyl-4-methyl-1, 3-dioxolane, 2-n-hexyl-1, 3-dioxolane, 2-octyl-4-methyl-1, 3-dioxolane, 2-methoxy-1, 3-dioxolane, 2-chloromethyl-1, 3-dioxolane, 2-bromomethyl-1, 3-dioxolane, 2-(2-bromoethyl)-1, 3-dioxolane, 2-aminomethyl-1, 3-dioxolane, 2-(2-aminoethyl)-1, 3-dioxolane, 2-phenyl-4-methyl-1, 3-dioxolane, 4-phenyl-1, 3-dioxolane, 2-(1-phenylethyl)-1, 3-dioxolane, 2-(1-phenylethyl)-4-methyl-1, 3-dioxolane, 2-benzyl-1, 3-dioxolane, 2-benzyl-4-methyl-1, 3-dioxolane, 2-benzyl-4, 4-dimethyl-1, 3-dioxolane, 2-benzyl-4-hydroxymethyl-1, 3-dioxolane, 2-{2-(2-methoxyethoxy)ethoxy}-1, 3-dioxolane, 2-benzyl-4, 4-dimethyl-1, 3-dioxane, 4-phenyl-1, 3-dioxane, 2-benzyl-5, 5-dimethyl-1, 3-dioxane, or the like.

The blending amount of the compound containing cyclic acetal group which is represented by the general formula (III) or (IV), is in the range of 0.01 to 5 parts by weight based on 100 parts by weight of the polycarbonate resin. If the blending amount of the compound containing cyclic acetal group is less than 0.01 parts by weight, the aimed effect of preventing the yellow discoloration upon exposure to an ionizing radiation cannot be sufficiently achieved. On the other hand, if the blending amount of the compound containing cyclic acetal group is more than 5 parts by weight, mechanical properties of the resultant polycarbonate resin composition are deteriorated. In order to attain both the effect of preventing the yellow discoloration and the deterioration of the mechanical properties under well-balanced conditions, the blending amount of the compound containing cyclic acetal group is preferably in the range of 0.05 to 3 parts by weight based on 100 parts by weight of the polycarbonate resin.

The weight ratio of the compound containing cyclic acetal group represented by the general formula (III) or (IV) to the aromatic compound containing oxy group or carbonyl group represented by the general formula (I) or (II) is not particularly limited, but is preferably in the range of 10/90 to 90/10, more preferably 20/80 to 80/20.

As described above, when the aromatic compound containing oxy group or carbonyl group and the compound containing cyclic acetal group represented by the general formula (III) or (IV) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

(B): The sulfone compounds used in the composition according to the present invention, are represented by the following formula (V), (VI) or (VII):

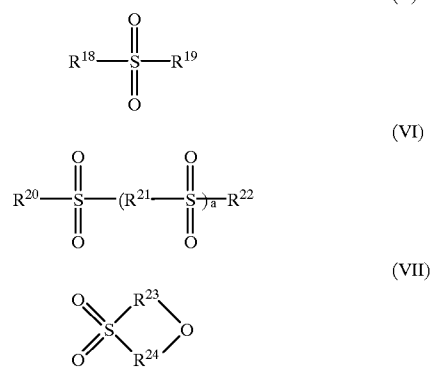

where $R^{18}$, $R^{19}$, $R^{20}$ and $R^{22}$ are independently a $(C_1-C_{30})$ alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, a $(C_1-C_{30})$ acyl$(C_1-C_{30})$alkyl group, a $(C_1-C_{30})$alkoxy$(C_1-C_{30})$alkyl group, a $(C_6-C_{30})$aryl$(C_1-C_{30})$alkoxy$(C_1-C_{30})$alkyl group, or a $(C_6-C_{30})$aryl$(C_1-C_{30})$alkoxy$(C_2-C_{30})$alkenyl group, in which the said aryl group, the said arylalkyl group, the said arylalkenyl group, the said arylalkoxyalkyl group and the said arylalkoxyalkenyl group may have substituent group(s) bonded to the aromatic ring thereof, the substituent group(s) being a $(C_1-C_4)$alkyl group, a halogen atom, —$NO_2$, —$N(R^{25})_2$, —OH, —$CH_2OR^{26}$ or —$OCH_3$ where $R^{25}$ and $R^{26}$ are independently a hydrogen atom, a $(C_1-C_{10})$alkyl group, a $(C_6-C_{30})$aryl group or a $(C_6-C_{30})$aryl$(C_1-C_{10})$alkyl group, and in which the said acylalkyl group, the said alkoxyalkyl group, the said arylalkoxyalkyl group and the said arylalkoxyalkenyl group may have substituent group(s) bonded to its alkyl or alkenyl chain and selected from a $(C_1-C_{30})$acyl group, a $(C_1-C_{30})$alkoxy group or a $(C_6-C_{30})$ aryl$(C_1-C_{30})$alkoxy group, and $R^{18}$ and $R^{19}$, or $R^{20}$ and $R^{22}$ may be covalently bonded with each other; $R^{21}$, $R^{23}$ and $R^{24}$ are independently a $(C_1-C_{15})$alkylene group, a $(C_2-C_{15})$ alkenylene group, or a $(C_6-C_{30})$arylene group, in which the said arylene group may have substituent group(s) bonded to the aromatic ring thereof, the substituent group(s) being a $(C_1-C_4)$alkyl group, a halogen atom, —$NO_2$, —$N(R^{25})_2$, —OH, —$CH_2OR^{26}$ or —$OCH_3$ where $R^{25}$ and $R^{26}$ have the same meaning as defined above; and a is an integer of 1 to 100.

These sulfone compounds may be used singly or in the form of the mixture thereof.

Specific examples of the sulfone compounds represented by the general formula (V) may include dimethyl sulfone, dibutyl sulfone, diphenyl sulfone, dihydroxyphenyl sulfone, ditolyl sulfone, dixylyl sulfone, dimesityl sulfone, dinitrophenyl sulfone, diaminophenyl sulfone, dichlorophenyl sulfone, dimethoxyphenyl sulfone, divinyl sulfone, dicyclohexyl sulfone, dibenzyl sulfone, 1-propenylmethyl sulfone, methylphenyl sulfone, methyltolyl sulfone, methylcyclohexyl sulfone, methylmethoxyphenyl sulfone, methylchlorophenyl sulfone, methylallyl sulfone, methylbenzyl sulfone, phenylallyl sulfone, phenyltolyl sulfone, phenylxylyl sulfone, phenylmethoxyphenyl sulfone, phenylvinyl sulfone, phenylbenzyl sulfone, phenylstyryl sulfone, phenylcinnamyl sulfone, trimethyl-3-(phenylsulfonyl)orthopropionate, phenylmethoxymethyl sulfone, phenylphenoxymethyl sulfone, phenylacetonyl sulfone, phenylphenathyl sulfone, phenylcyclohexyl sulfone, phenylmethyl-benzene-sulfone, phenylmethoxycarbonyl sulfone, tolylallyl sulfone, tolylbutyl sulfone, tolylphenathyl sulfone, tolylbenzyl sulfone, tolylaminophenyl sulfone, tolylchlorobenzyl sulfone, 4-(toluene-sulfonyl)butane-2-on, benzylallyl sulfone, trimethylene sulfone, tetramethylene sulfone, pentamethylene sulfone, benzothiophene dioxide, dibenzothiophene dioxide, thioxanthene-9, 9-dioxide, 2, 5-dihydroxythiophene-1, 1-dioxide, 4-butylthian-1,1-dioxide, or the like.

Specific examples of the sulfone compounds represented by the general formula (VI) may include bis(methylsulfonyl) methane, 2, 2-bis(methylsulfonyl)propane, bis (phenylsulfonyl)methane, 1,2-bis(phenylsulfonyl)ethane, 1, 2-bis(phenylsulfonyl)ethylene, phenylsulfonyl-benzylsulfonyl-phenyl methane, or the like.

Specific examples of the sulfone compounds represented by the general formula (VII) may include 1, 4-thioxane-1, 1-dioxide, or the like.

The blending amount of the sulfone compound, which is represented by the general formula (V), (VI) or (VII), is in the range of 0.01 to 5 parts by weight based on 100 parts by weight of the polycarbonate resin. If the blending amount of the sulfone compound is less than 0.01 parts by weight, the aimed effect of preventing the yellow discoloration upon application of an ionizing radiation cannot be sufficiently achieved. On the other hand, if the blending amount of the sulfone compound is more than 5 parts by weight, mechanical properties of the resultant polycarbonate resin composition are unsuitably deteriorated. In order to attain both the effect of preventing the yellow discoloration and the deterioration of the mechanical properties under well-balanced conditions, the blending amount of the sulfone compound is preferably in the range of 0.05 to 3 parts by weight based on 100 parts by weight of the polycarbonate resin.

The weight ratio of the sulfone compound represented by the general formula (V), (VI) or (VII) to the aromatic compound containing oxy group or carbonyl group represented by the general formula (I) or (II) is not particularly limited, but is preferably in the range of 10/90 to 90/10, more preferably 20/80 to 80/20.

As described above, when the aromatic compound containing oxy group or carbonyl group and the sulfone compound represented by the general formula (V), (VI) or (VII) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

(C): The sulfoxide compounds used in the composition according to the present invention, are represented by the following formula (VIII), (IX) or (X):

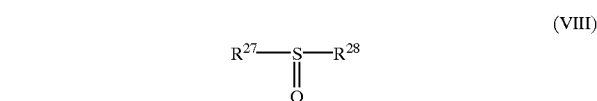

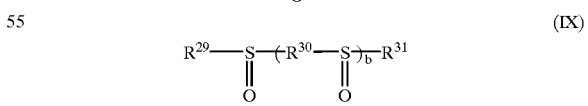

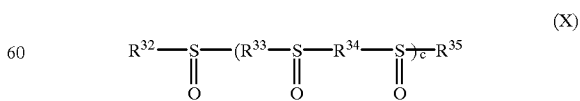

where $R^{27}$, $R^{28}$, $R^{29}$, $R^{31}$, $R^{32}$ and $R^{35}$ are independently a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$ aryl$(C_1-C_{30})$alkyl group, a $(C_6-C_{30})$aryl$(C_2-C_{30})$alkenyl group, a $(C_1-C_{30})$acyl$(C_1-C_{30})$alkyl group, a $(C_1-C_{30})$ alkoxy$(C_1-C_{30})$alkyl group, a $(C_6-C_{30})$aryl$(C_1-C_{30})$alkoxy $(C_1-C_{30})$alkyl group, a $(C_6-C_{30})$aryl$(C_1-C_{30})$alkoxy $(C_2-C_{30})$alkenyl group, a $(C_1-C_{30})$alkoxy group, a $(C_1-C_{30})$ alkoxycarbonyl group, a polyethylene-glycol-ether group or a pyridyl group, in which the said aryl group, the said arylalkyl group, the said arylalkenyl group, the said arylalkoxyalkenyl group and the said arylalkoxyalkyl group may have substituent group(s) bonded to the aromatic ring thereof, the substituent group(s) being a $(C_1-C_4)$alkyl group, a halogen atom, —$NO_2$, —$N(R^{36})_2$, —COOH, —$COOCH_3$, —OH, —$CH_2OR^{37}$ or —$OCH_3$, and in which the said acylalkyl group, the said alkoxyalkyl group, the said arylalkoxyalkenyl group and the said arylalkoxyalkyl group may have substituent group(s) bonded to the alkyl or alkenyl chain thereof, the substituent group(s) being a $(C_1-C_{30})$acyl group, a $(C_1-C_{30})$alkoxy group or a $(C_6-C_{30})$aryl$(C_1-C_{30})$ alkoxy group; $R^{27}$ and $R^{28}$, $R^{29}$ and $R^{31}$ or $R^{32}$ and $R^{35}$ may be covalently bonded with each other; $R^{30}$, $R^{33}$ and $R^{34}$ are independently a $(C_1-C_{15})$alkylene group, a $(C_2-C_{15})$ alkenylene group, a $(C_6-C_{30})$arylene group, a $(C_6-C_{30})$ arylenedi$(C_1-C_{15})$alkylene group, or —$O(CH_2CHR^{38}O)_t$—, in which the said arylene group and the said arylenedialkylene group may have substituent group(s) bonded to the aromatic ring thereof, the substituent group(s) being a $(C_1-C_4)$alkyl group, a halogen atom, —$NO_2$, —$N(R^{36})_2$, —COOH, —$COOCH_3$, —OH, —$CH_2OR^{37}$ or —$OCH_3$, and $R^{33}$ and $R^{34}$ are different from each other; $R^{36}$, $R^{37}$ and $R^{38}$ are independently a hydrogen atom, a $(C_1-C_{10})$alkyl group, a $(C_6-C_{15})$aryl group or a $(C_6-C_{15})$aryl$(C_1-C_{10})$alkyl group; and b, c and t are independently an integer of 1 to 100.

These sulfoxide compounds may be used singly or in the form of the mixture thereof.

Specific examples of the sulfoxide compounds represented by the general formula (VIII) may include dimethyl sulfoxide, dibutyl sulfoxide, diphenyl sulfoxide, dihydroxyphenyl sulfoxide, ditolyl sulfoxide, dibenzyl sulfoxide, divinyl sulfoxide, dixylyl sulfoxide, dimesityl sulfoxide, dinitrophenyl sulfoxide, diaminophenyl sulfoxide, dichlorophenyl sulfoxide, dimethoxyphenyl sulfoxide, dicyclohexyl sulfoxide, 1-propenylmethyl sulfoxide, methylcyclohexyl sulfoxide, methylphenyl sulfoxide, methyltolyl sulfoxide, methylmethoxyphenyl sulfoxide, methylchlorophenyl sulfoxide, methylcarboxyphenyl sulfoxide, methylallyl sulfoxide, methylbenzyl sulfoxide, phenylallyl sulfoxide, phenyltolyl sulfoxide, phenylxylyl sulfoxide, phenylmethoxyphenyl sulfoxide, phenylvinyl sulfoxide, phenylbenzyl sulfoxide, phenylstyryl sulfoxide, phenylcinnamyl sulfoxide, trimethyl-3-(phenylsulfinyl)orthopropionate, phenylmethoxymethyl sulfoxide, phenylphenoxymethyl sulfoxide, phenylacetonyl sulfoxide, phenylphenathyl sulfoxide, phenylcyclohexyl sulfoxide, phenylmethylbenzyl sulfoxide, phenylmethoxycarbonyl sulfoxide, tolylbenzyl sulfoxide, tolylbutyl sulfoxide, tolylphenathyl sulfoxide, tolylbutoxy sulfoxide, tolylallyl sulfoxide, tolylaminophenyl sulfoxide, tolylchlorobenzyl sulfoxide, 4-(toluene-sulfinyl)butane-2-on, benzylallyl sulfoxide, 2-pyridylbenzyl sulfoxide, acetonylnitrophenyl sulfoxide, trimethylene sulfoxide, tetramethylene sulfoxide, pentamethylene sulfoxide, benzothiophene-1-oxide, dibenzothiophene-1-oxide, thioxanthene-9-oxide, 2, 5-dihydroxythiophene-1-oxide, 4-butylthian-1-oxide, or the like.

Specific examples of the sulfoxide compounds represented by the general formula (IX) may include bis(methylsulfinyl)methane, 2, 2-bis(methylsulfinyl)propane, bis(phenylsulfinyl)methane, 1, 2-bis(phenylsulfinyl)ethane, 1, 2-bis(phenylsulfinyl)ethylene, phenylsulfinylbenzylsulfinylphenyl methane, 1, 4-dithian-1, 4-dioxide, polytetramethylene sulfoxide, polyhexamethylene sulfoxide, or the like.

Specific examples of the sulfoxide compounds represented by the general formula (X) may include poly(hexamethylenesulfoxide-co-octamethylenesulfoxide), poly(phenylenesulfoxide-co-hexamethylenesulfoxide), poly(hexamethylenesulfoxide-co-3, 6, 9, 12, 15, 18-hexaoxyeicosanylene-sulfoxide), or the like.

The blending amount of the sulfoxide compound, which is represented by the general formula (VIII), (IX) or (X), is in the range of 0.01 to 5 parts by weight based on 100 parts by weight of the polycarbonate resin. If the blending amount of the said sulfoxide compound is less than 0.01 parts by weight, the aimed effect of preventing the yellow discoloration upon exposure to an ionizing radiation cannot be sufficiently achieved. On the other hand, if the blending amount of the said sulfoxide compound is more than 5 parts by weight, mechanical properties of the resultant polycarbonate resin composition are unsuitably deteriorated. In order to attain both the aimed effect of preventing the yellow discoloration and the deterioration of the mechanical properties under well-balanced conditions, the blending amount of the sulfoxide compound is preferably in the range of 0.05 to 3 parts by weight based on 100 parts by weight of the polycarbonate resin.

The weight ratio of the sulfoxide compound represented by the general formula (VIII), (IX) or (X) to the aromatic compound containing oxy group or carbonyl group represented by the general formula (I) or (II) is not particularly limited, but is preferably in the range of 10/90 to 90/10, more preferably 20/80 to 80/20.

As described above, when the aromatic compound containing oxy group or carbonyl group and the sulfoxide compound represented by the general formula (VIII), (IX) or (X) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

(D) The polyalkylene glycol, the ether of polyalkylene glycol or the ester of polyalkylene glycol (hereinafter referred to as polyalkylene glycol derivative) used in the composition according to the present invention may be those represented by the general formula (XI) or (XII):

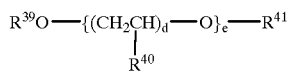

(XI)

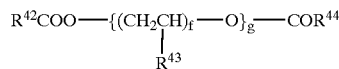

(XII)

where $R^{39}$, $R^{41}$, $R^{42}$ and $R^{44}$ are independently a hydrogen atom, a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$ aryl$(C_1-C_{30})$alkyl group or a $(C_6-C_{30})$aryl$(C_2-C_{30})$alkenyl group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; $R^{40}$ and $R^{43}$ are independently a hydrogen atom or a $(C_1-C_4)$alkyl group; e and g are independently an integer of not less than 1, preferably 1 to 1000, and d and f are independently an integer of 1 to 10.

These polyalkylene glycol derivatives may be used singly or in the form of the mixture thereof.

Specific examples of the polyalkylene glycol derivatives represented by the general formula (XI) may include polyethylene glycol, polyethylene glycol methylether, polyethylene glycol dimethylether, polyethylene glycol dodecylether, polyethylene glycol benzylether, polyethylene glycol dibenzylether, polyethylene glycol-4-nonylphenylether, polypropylene glycol, polypropylene glycol methylether, polypropylene glycol dimethylether, polypropylene glycol dodecylether, polypropylene glycol benzylether, polypropylene glycol dibenzylether, polypropylene glycol-4-nonylphenylether, polytetramethylene glycol, or the like.

Specific examples of the polyalkylene glycol derivatives represented by the general formula (XII) may include polyethylene glycol diacetate, polyethylene glycol-(monoacetate)monopropionate, polyethylene glycol dibutyrate, polyethylene glycol distearate, polyethylene glycol dibenzoate, polyethylene glycol di-2, 6-dimethylbenzoate, polyethylene glycol di-p-tert-butyl-benzoate, polyethylene glycol dicaprylate, polypropylene glycol diacetate, polypropylene glycol-(monoacetate)monopropionate, polypropylene glycol dibutyrate, polypropylene glycol distearate, polypropylene glycol dibenzoate, polypropylene glycol di-2, 6-dimethylbenzoate, polypropylene glycol di-p-tert-butyl-benzoate, polypropylene glycol dicaprylate, or the like.

The blending amount of the polyalkylene glycol derivative, which is represented by the general formula (XI) or (XII), is in the range of 0.01 to 5 parts by weight based on 100 parts by weight of the polycarbonate resin. If the blending amount of the compound is less than 0.01 parts by weight, the aimed effect of preventing the yellow discoloration upon exposure to an ionizing radiation cannot be sufficiently achieved. On the other hand, if the blending amount of the polyalkylene glycol derivative is more than 5 parts by weight, mechanical properties of the resultant polycarbonate resin composition are unsuitably deteriorated. In order to attain both the aimed effect of preventing the yellow discoloration and the deterioration of the mechanical properties under well-balanced conditions, the blending amount of the polyalkylene glycol derivative is preferably in the range of 0.05 to 3 parts by weight based on 100 parts by weight of the polycarbonate resin.

The weight ratio of the polyalkylene glycol derivative represented by the general formula (XI) or (XII) to the aromatic compound containing oxy group or carbonyl group represented by the general formula (I) or (II) is not particularly limited, but is preferably in the range of 10/90 to 90/10, more preferably 20/80 to 80/20.

As described above, when the aromatic compound containing oxy group or carbonyl group and the aforementioned polyalkylene glycol derivative of the general formula (XI) or (XII) are blended at specified blending ratios with the polycarbonate resin, the resultant polycarbonate resin composition shows no deterioration of its mechanical properties and a very low yellow discoloration when exposed to an ionizing radiation for sterilization thereof.

(E): The compound containing sulfonate groups used in the composition according to the present invention, are represented by the following formula (XIII), (XIV) or (XV):

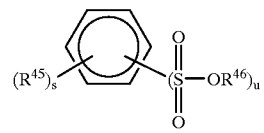

(XIII)

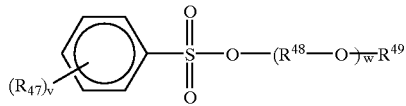

(XIV)

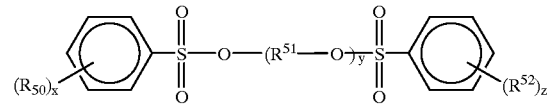

(XV)

where $R^{45}$, $R^{47}$, $R^{50}$ and $R^{52}$ are independently a $(C_1-C_{30})$ alkyl group, a $(C_6-C_{30})$aryl group, a $(C_6-C_{30})$arylsulfone group or a halogen atom; $R^{46}$ and $R^{49}$ are independently a hydrogen atom, a $(C_1-C_{30})$alkyl group, a $(C_3-C_{30})$ cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl $(C_2-C_{30})$alkenyl group or a $(C_1-C_{30})$acyl group, in which the said aryl group, the said arylalkyl group and the said arylalkenyl group may have substituent group(s) bonded to the aromatic ring thereof, the substituent group(s) being a $(C_1-C_4)$alkyl group or a halogen atom; $R^{48}$ and $R^{51}$ are independently a $(C_1-C_{15})$alkylene group, a $(C_2-C_{15})$ alkenylene group or a $(C_6-C_{30})$arylene group, in which the said arylene group may have substituent group(s) bonded to the aromatic ring thereof, the substituent group(s) being a $(C_1-C_4)$alkyl group or a halogen atom; s, v, x and z are independently an integer of 0 to 5 and u is an integer of 1 to 6, preferably 1 to 3 with provided that a sum of s and u is in the range of 1 to 6; and w and y are independently an integer of not less than 1, preferably from 1 to 500.

These compound containing sulfonate groups may be used singly or in the form of the mixture thereof.

Specific examples of the compound containing sulfonate groups represented by the general formula (XIII) may include methyl benzene-sulfonate, phenyl benzene-sulfonate, methyl toluene-sulfonate, ethyl toluene-sulfonate, butyl toluene-sulfonate, phenyl toluene-sulfonate, benzyl toluene-sulfonate, phenathyl toluene-sulfonate, naphthyl toluene-sulfonate, methyl xylene-sulfonate, phenyl xylene-sulfonate, methyl mesitylene-sulfoante, phenyl mesitylene-sulfoante, methyl benzene-disulfonate, phenyl benzene-disulfonate, diphenyl-sulfone-3-methyl sulfonate, diphenyl-sulfone-3-phenyl sulfonate, or the like.

Specific examples of the compound containing sulfonate groups represented by the general formula (XIV) may include methoxyethyl benzene-sulfonate, methoxymethyl toluene-sulfonate, methoxyethyl toluene-sulfonate, ethoxyethyl toluene-sulfonate, butoxyethyl toluene-sulfonate, phenoxyethyl toluene-sulfonate, benzyloxyethyl toluene-sulfonate, methoxyethyl xylene-sulfonate, methoxyethyl mesitylene-sulfonate, butoxyethoxyethyl toluene-sulfonate, phenoxyethoxyethyl toluene-sulfonate, benzyloxyethoxyethyl toluene-sulfonate, or the like.

Specific examples of the compound containing sulfonate groups represented by the general formula (XV) may include bis-tosyloxy methane, 1, 2-bis-tosyloxy ethane, diethylene glycol-di-p-tosylate, tetraethylene glycol-di-p-tosylate, or the like.

The blending amount of the compound containing sulfonate group, which is represented by the general formula (XIII), (XIV) or (XV), is in the range of 0.01 to 5 parts by weight based on 100 parts by weight of the polycarbonate resin. It the blending amount of the compound containing sulfonate group is less than 0.01 parts by weight, the aimed effect of preventing the yellow discoloration upon exposure to an ionizing radiation cannot be sufficiently achieved. On the other hand, if the blending amount of the compound containing sulfonate group is more than 5 parts by weight, mechanical properties of the resultant polycarbonate resin composition are unsuitably deteriorated. In order to attain both the aimed effect of preventing the yellow discoloration and the deterioration of the mechanical properties under well-balanced conditions, the blending amount of the compound containing sulfonate group is preferably in the range of 0.05 to 3 parts by weight based on 100 parts by weight of the polycarbonate resin.

The weight ratio of the compound containing sulfonate group represented by the general formula (XIII), (XIV) or (XV) to the aromatic compound containing oxy group or carbonyl group represented by the general formula (I) or (II) is not particularly limited, but is preferably in the range of 10/90 to 90/10, more preferably 20/80 to 80/20.

As described above, when the aromatic compound containing oxy group or carbonyl group and the compound containing sulfonate group represented by the general formula (XIII), (XIV) or (XV) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

(F). The aromatic hydrocarbon-aldehyde resins used in the composition according to the present invention may be prepared by reacting aromatic hydrocarbon with aldehyde in the presence of an acid catalyst.

Specific examples of the aromatic hydrocarbons used for the preparation of the aromatic hydrocarbon-aldehyde resins may include monocyclic aromatic hydrocarbon compounds such as benzene, toluene, ethyl benzene, xylene, methylethyl benzene, trimethyl benzene, tetramethyl benzene, pseudocumene or cumene, polycyclic aromatic hydrocarbon compounds such as naphthalene, methyl naphthalene, ethyl naphthalene, dimethyl naphthalene, acenaphthene, anthracene or the like. These aromatic hydrocarbon compounds may be used singly or in the form of the mixture thereof. Among them, the especially preferred aromatic hydrocarbon compounds are toluene, xylene, mesitylene, pseudocumene, naphthalene or the like.

Specific examples of the aldehydes used for the preparation of the aromatic hydrocarbon-aldehyde resins may include saturated aliphatic aldehydes such as formaldehyde, acetaldehyde, propionaldehyde, butylaldehyde, isobutylaldehyde, valeraldehyde, laurinaldehyde or stearinaldehyde; aliphatic polyvalent aldehydes such as glyoxal or succindialdehyde; unsaturated aliphatic aldehydes such as acrolein, crotonaldehyde or propiolaldehyde; aromatic aldehydes such as benzaldehyde, tolylaldehyde, salicylaldehyde, cinnamaldehyde or naphthaldehyde; heterocyclic aldehydes such as furfural; aldehyde derivatives such as methylal, dioxolane, trioxane, tetraoxane, paraformaldehyde, paraldehyde or metaldehyde, or the like.

These aldehydes may be used singly or in the form of the mixture thereof. Among them, the especially preferred aldehydes are formaldehyde, trioxane, paraformaldehyde, acetaldehyde, or the like.

It is preferred that the aromatic hydrocarbon-aldehyde resin contains substantially no acetal group and has such a structure that adjacent aromatic rings are mainly bonded through an alkylene group or alkylene-ether group with each other. The expression "substantially no acetal group" means that the acetal group is contained in an amount of not more than 0.1 mole based on one molecule of the aromatic hydrocarbon-aldehyde resins.

Such aromatic hydrocarbon-aldehyde resins containing substantially no acetal group are commercially available. For example, as the commercially available aromatic hydrocarbon-aldehyde resins, NICANOL DS, NICANOL S or NICANOL K (produced by Mitsubishi Gas Chemical Co., Ltd.), may be exemplified. Further, the aromatic hydrocarbon-aldehyde resins can be prepared according to methods disclosed in Japanese Patent Application Laid-open (Kokai) Nos. 60-51133 (1985), 61-23016 (1986), 61-213216 (1986), 63-196616 (1988), 4-224825 (1992), 4-335014 (1992), 5-186544 (1993), 6-136081 (1994) and the like.

It is further preferred that the aromatic hydrocarbon-aldehyde resins used in the present invention, have an oxygen content of not less than 8% by weight, preferably 9 to 25% by weight. Such aromatic hydrocarbon-aldehyde resins are commercially available. For example, as the commercially available aromatic hydrocarbon-aldehyde resins having an oxygen content of not less than 8% by weight, NICANOL H, NICANOL L, NICANOL G or NICANOL Y (produced by Mitsubishi Gas Chemical Co., Ltd.), GENERITE 6010 or GENERITE 5100 (produced by General Petroleum Chemical Co., Ltd.), may be exemplified.

These aromatic hydrocarbon-aldehyde resins may be used singly or in the form of the mixture thereof.

The blending amount of the aromatic hydrocarbon-aldehyde resins is in the range of 0.01 to 5 parts by weight, preferably 0.1 to 2 parts by weight based on 100 parts by weight of the polycarbonate resin. If the blending amount of the aromatic hydrocarbon-aldehyde resins is less than 0.01 parts by weight, the aimed effect of preventing the yellow discoloration upon exposure to an ionizing radiation cannot be sufficiently achieved. On the other hand, if the blending amount of the aromatic hydrocarbon-aldehyde resins is more than 5 parts by weight, mechanical properties, heat resistance, etc. of the resultant polycarbonate resin composition are unsuitably deteriorated.

The weight ratio of the aromatic hydrocarbon-aldehyde resins to the aromatic compound containing oxy group or carbonyl group represented by the general formula (I) or (II) is not particularly limited, but is preferably in the range of 10/90 to 90/10, more preferably 20/80 to 80/20.

As described above, when the aromatic compound containing oxy group or carbonyl group and the aromatic hydrocarbon-aldehyde resins are blended at specified blending ratios with the polycarbonate resin, the resultant polycarbonate resin composition can exhibit no deterioration of its mechanical properties and a very low yellow discoloration upon exposure to an ionizing radiation for sterilization thereof.

Further, among the polycarbonate resin compositions comprising the polycarbonate resin, the aromatic compound containing oxy group or carbonyl group and at least two compounds selected from the group consisting of the aforementioned compounds (A) to (F), the following polycarbonate resin composition is preferred.

The polycarbonate resin composition contains 100 parts by weight of the polycarbonate resin, 0.01 to 5 parts by weight of the aromatic compound containing oxy group or carbonyl group, 0.01 to 5 parts by weight of the compound containing cyclic acetal group of the general formula (III) or (IV) and 0.01 to 5 parts by weight of the polyalkylene glycol, the ether of polyalkylene glycol or the ester of polyalkylene glycol of the general formula (XI) or (XII).

In this case, as described previously, the blending amount of the compound containing cyclic acetal group represented by the general formula (III) or (IV) is in the range of 0.01 to 5 parts by weight based on 100 parts by weight of the polycarbonate resin. If the blending amount of the compound containing cyclic acetal group is less than 0.01 parts by weight, the aimed effect of preventing the yellow discoloration upon exposure to an ionizing radiation cannot be sufficiently achieved. On the other hand, if the blending amount of the said compound containing cyclic acetal group is more than 5 parts by weight, mechanical properties of the resultant polycarbonate resin composition are deteriorated. In order to attain both the aimed effect of preventing the yellow discoloration and the deterioration of the mechanical properties under well-balanced conditions, the blending amount of the said compound containing cyclic acetal group is preferably in the range of 0.05 to 3 parts by weight based on 100 parts by weight of the polycarbonate resin.

Further, in this case, as also described previously, the blending amount of the polyalkylene glycol derivative represented by the general formula (XI) or (XII) is in the range of 0.01 to 5 parts by weight based on 100 parts by weight of the polycarbonate resin. If the blending amount of the said polyalkylene glycol derivative is less than 0.01 parts by weight, the resultant polycarbonate resin composition cannot exhibit the aimed effect of preventing the yellow discoloration upon exposure to an ionizing radiation and mold release characteristics to a sufficient extent. On the other hand, if the blending amount of the said polyalkylene glycol derivative is more than 5 parts by weight, mechanical properties of the resultant polycarbonate resin composition are unsuitably deteriorated. In order to attain the aimed effect of preventing the yellow discoloration, and the deterioration of the mechanical properties and the mold-release properties under well-balanced conditions, the blending amount of the said polyalkylene glycol derivative is preferably in the range of 0.05 to 3 parts by weight based on 100 parts by weight of the polycarbonate resin.

In the afore-mentioned especially preferred polycarbonate resin composition, the blending percentage of each of the aromatic compound containing oxy group or carbonyl group, the compound containing cyclic acetal group and the polyalkylene glycol derivative, is preferably in the range of 5 to 90% by weight, more preferably 15 to 80% by weight based on the total weight of these three compounds, though not particularly limited thereto. Thus, by blending the aromatic compound containing oxy group or carbonyl group, the compound containing cyclic acetal group, and the polyalkylene glycol derivative at specified blending percentages with the polycarbonate resin, there can be produced a polycarbonate resin composition capable of exhibiting a very low yellow discoloration without deterioration of its mechanical properties and excellent mold-release properties.

In the present invention, the blending of the aromatic compound containing oxy group or carbonyl group and at least one compound selected from the group consisting of the afore-mentioned compounds (A) to (F) with the polycarbonate resin, can be carried out at any optional stage up to the production of a final molded product according to various methods known in the art. Examples of the blending methods may include a mixing method using a tumbler, a Henschel mixer or the like, a mixing method in which the afore-mentioned components are quantitatively fed into a hopper of an extruder, or the like.

The polycarbonate resin composition according to the present invention may further contain other additives to impart appropriate properties thereto, if required. Examples of the additives may include flame-retardants such as halogen compounds, phosphorus compounds or metal salts of sulfonic acid; flame-retardant assistants such as antimony compounds or zirconium compounds; melt drop-preventing agents upon ignition such as polytetrafluoroethylene or silicon compounds; impact modifiers such as elastomers; anti-oxidants; heat stabilizers; ultraviolet light absorbers; anti-static agents; plasticizers; mold release agents; lubricants; compatibilizing agents; foaming agents; reinforcing agents such as glass fiber, glass beads, glass flakes, carbon fiber, fibrous magnesium, potassium titanate whiskers, ceramic whiskers, mica or talc; filler; pigments; or the like. These additives may be used singly or in combination.

The polycarbonate resin composition can be formed into a molded product according to a conventional molding method such as an injection-molding method, a blow-molding method or the like. Specific examples of the medical supplies and appliances to which the polycarbonate resin composition according to the present invention is suitably applied, include an artificial dialyzer, an artificial lung, an anesthetic inhaler, a vein connector or accessories, a hemocentrifugal bowl, surgical appliances, appliances for an operation room, tubes for feeding oxygen into blood, connectors for tubes, cardiac probes and injectors, containers for the surgical appliances, the appliances for an operation room or an intravenous injection liquid, or the like.

The polycarbonate resin composition according to the present invention can show a very low yellow discoloration when exposed to an ionizing radiation for sterilization while maintaining inherent properties of polycarbonate resin, and excellent mold-release properties. Accordingly, the polycarbonate resin composition according to the present invention is useful for medical products, medical apparatuses, components for such medical apparatuses, or the like.

EXAMPLES

The present invention is described in more detail below by way of the examples. However, the examples are only illustrative and therefore the present invention is not limited to these examples.

Examples 1 to 6 and Comparative Examples 1 to 3

An aromatic compound containing oxy group or carbonyl group and a compound containing cyclic acetal group shown in Table 1 were blended, at blending ratios also shown in Table 1, with 100 parts by weight of a polycarbonate resin (Iupiron S-2000 having a viscosity-average molecular weight of 25,000, produced by Mitsubishi Engineering Plastics Co., Ltd.) in a tumbler. The mixture was fed into a vented single-screw extruder having an screw diameter of 40 mm$\phi$ and extruded into pellets at a barrel temperature of 270° C.

The thus-prepared pellets were dried in a hot-air drier at a temperature of 120° C. for not less than 5 hours. Thereafter, the dried pellets were injection-molded at a resin temperature of 270° C. and mold temperature of 80° C. to prepare a test specimen having a diameter of 50 mm$\phi$ and a thickness of 3 mm.

The thus-obtained test specimens were exposed to 25 kGy of a cobalt-60 gamma radiation and then they were measured the change in yellowness index ($\Delta$YI) thereof. The measurements of the yellowness index of the test specimens were carried out according to JIS K7103 by using a color difference meter (SM- 3-CH, manufactured by SUGA Test Instruments Co., Ltd). The results are also shown in Table 1.

Meanwhile, the yellowness index of the polycarbonate resin composition according to the present invention was normally not more than 9.5.

TABLE 1

| Example No. | Aromatic compound containing oxy group or carbonyl group/compound containing cyclic acetal group | Blending ratio (part by weight) | ΔYI |
|---|---|---|---|
| Example 1 | dibenzyl ketone/2,2'-trimethylene bis-1,3-dioxolane | 0.2/0.5 | 9.3 |
| Example 2 | dibenzyl ether/2-benzyl-1,3-dioxolane | 0.2/0.2 | 8.7 |
| Example 3 | benzoin/2-benzyl-1,3-dioxolane | 0.5/0.5 | 6.2 |
| Example 4 | 1,2-dibenzyloxy ethane/2-methoxy-1,3-dioxolane | 0.5/0.75 | 7.9 |
| Example 5 | benzyl benzoate/2-benzyl-4-methyl-1,3-dioxolane | 1.0/0.25 | 8.2 |
| Example 6 | dicyclohexyl phthalate/4-phenyl-1,3-dioxane | 0.5/0.5 | 7.2 |
| Comparative Example 1 | Not added | — | 18.1 |
| Comparative Example 2 | benzyl benzoate/- | 1.0/- | 10.3 |
| Comparative Example 3 | -/2-benzyl-1,3-dioxolane | -/0.5 | 10.5 |

Examples 7 to 12 and Comparative Examples 4 to 5

An aromatic compound containing oxy group or carbonyl group and a sulfone compound shown in Table 2 were blended, at blending ratios also shown in Table 2, with 100 parts by weight of a polycarbonate resin (Iupiron S-2000 having a viscosity-average molecular weight of 25,000, produced by Mitsubishi Engineering Plastics Co., Ltd.) in a tumbler. The mixture was fed into a vented single-screw extruder having a screw diameter of 40 mmφ and extruded into pellets at a barrel temperature of 270° C.

The thus-prepared pellets were dried in a hot-air drier at a temperature of 120° C. for not less than 5 hours. Thereafter, the dried pellets were injection-molded at a resin temperature of 270° C. and a mold temperature of 80° C. to prepare a test specimen having a diameter of 50 mmφ and a thickness of 3 mm.

The thus-prepared test specimens were exposed to 25 kGy of a cobalt-60 gamma radiation and then they were measured for the change in yellowness index (ΔYI) thereof. The measurements of the yellowness index of the test specimens were carried out according to JIS K7103 by using a color difference meter (SM-3-CH, manufactured by SUGA Test Instruments Co., Ltd). The results are also shown in Table 2.

TABLE 2

| Example No. | Aromatic compound containing oxy group or carbonyl group/sulfone compound | Blending ratio (part by weight) | ΔYI |
|---|---|---|---|
| Example 7 | dibenzyl ketone/diphenyl sulfone | 0.5/0.25 | 8.7 |
| Example 8 | dibenzyl ether/diphenyl sulfone | 0.5/0.5 | 6.9 |

TABLE 2-continued

| Example No. | Aromatic compound containing oxy group or carbonyl group/sulfone compound | Blending ratio (part by weight) | ΔYI |
|---|---|---|---|
| Example 9 | dibenzyl ether/dibenzyl sulfone | 0.25/0.25 | 7.6 |
| Example 10 | benzyl benzoate/dibenzyl sulfone | 0.75/0.25 | 9.5 |
| Example 11 | dicyclohexyl phthalate/dibenzyl sulfone | 1.0/0.5 | 9.2 |
| Example 12 | dibenzyl ether/phenylphenathyl sulfone | 0.25/0.25 | 7.9 |
| Comparative Example 4 | -/diphenyl sulfone | -/1.5 | 13.1 |
| Comparative Example 5 | -/dibenzyl sulfone | -/0.5 | 11.6 |

Examples 13 to 15 and Comparative Example 6

An aromatic compound containing oxy group or carbonyl group and a sulfoxide compound shown in Table 3 were blended, at blending ratios also shown in Table 3, with 100 parts by weight of a polycarbonate resin (Iupiron S-2000 having a viscosity-average molecular weight of 25,000, produced by Mitsubishi Engineering Plastics Co., Ltd.) in a tumbler. The mixture was fed into a vented single-screw extruder having a screw diameter of 40 mmφ and extruded into pellets at a barrel temperature of 270° C.

The thus-prepared pellets were dried in a hot-air drier at a temperature of 120° C. for not less than 5 hours. Thereafter, the dried pellets were injection-molded at a resin temperature of 270° C. and a mold temperature of 80° C. to prepare a test specimen having a diameter of 50 mmφ and a thickness of 3 mm.

The thus-prepared test specimens were exposed to 25 kGy of a cobalt-60 gamma radiation and then they were measured for the change in yellowness index (ΔYI) thereof. The measurements of the yellowness index of the test specimens were carried out according to JIS K7103 by using a color difference meter (SM-3-CH, manufactured by SUGA Test Instruments Co., Ltd). The results are also shown in Table 3.

TABLE 3

| Example No. | Aromatic compound containing oxy group or carbonyl group/sulfoxide compound | Blending ratio (part by weight) | ΔYI |
|---|---|---|---|
| Example 13 | dibenzyl ketone/phenylmethyl sulfoxide | 0.5/0.5 | 9.1 |
| Example 14 | dibenzyl ether/diphenyl sulfoxide | 0.25/0.25 | 7.4 |
| Example 15 | 1,2-dibenzyloxy ethane/phenylmethyl sulfoxide | 0.25/0.75 | 8.2 |
| Comparative Example 6 | -/diphenyl sulfoxide | -/1.0 | 12.3 |

Examples 16 to 19 and Comparative Example 7

An aromatic compound containing oxy group or carbonyl group and a polyalkylene glycol derivative shown in Table 4 were blended, at blending ratios also shown in Table 4, with 100 parts by weight of a polycarbonate resin in a tumbler. The mixture was fed into a vented single-screw extruder having a screw diameter of 40 mmφ and extruded into pellets at a barrel temperature of 270° C.

Specifically, the raw materials used in this example were as follows.

(1) Polycarbonate resin:

Iupiron S-2000 having a viscosity-average molecular weight of 25,000, produced by Mitsubishi Engineering Plastics Co., Ltd.

(2) Polyalkylene glycol derivative:

PEG1000: polyethylene glycol having an average molecular weight of 1,000, or PPG2000: polypropylene glycol having a molecular weight of 2,000.

The pellets were then dried in a hot-air drier at a temperature of 120° C. for not less than 5 hours. Thereafter, the dried pellets were injection-molded at a resin temperature of 270° C. and a mold temperature of 80° C. to prepare a test specimen having a diameter of 50 mmφ and a thickness of 3 mm.

The thus-prepared test specimens were exposed to 25 kGy of a cobalt-60 gamma radiation and then they were measured for the change in yellowness index (ΔYI) thereof. The measurements of the yellowness index of the test specimens were carried out according to JIS K7103 by using a color difference meter (SM-3-CH, manufactured by SUGA Test Instruments Co., Ltd). The results are also shown in Table 4.

TABLE 4

| Example No. | Aromatic compound oxy group or carbonyl group/polyalkylene glycol derivative | Blending ratio (part by weight) | ΔYI |
|---|---|---|---|
| Example 16 | 1,4-bis-methoxymethyl benzene/PPG2000 | 0.5/0.5 | 6.9 |
| Example 17 | dibenzyl ether/PPG2000 | 0.5/0.5 | 8.2 |
| Example 18 | 1,2-dibenzyloxy ethane/PPG2000 | 0.5/0.5 | 9.2 |
| Example 19 | dicyclohexyl phthalate/PEG1000 | 0.75/0.5 | 8.7 |
| Comparative Example 7 | -/PPG2000 | -/1.0 | 12.7 |

Examples 20 to 26 and Comparative Example 8

An aromatic compound containing oxy group or carbonyl group and a compound containing sulfonate group shown in Table 5 were blended, at blending ratios also shown in Table 5, with 100 parts by weight of a polycarbonate resin (Iupiron S-2000 having a viscosity-average molecular weight of 25,000, produced by Mitsubishi Engineering Plastics Co., Ltd.) in a tumbler. The mixture was fed into a vented single-screw extruder having a screw diameter of 40 mmφ and extruded into pellets at a barrel temperature of 270° C.

The thus-prepared pellets were dried in a hot-air drier at a temperature of 120° C. for not less than 5 hours. Thereafter, the dried pellets were injection-molded at a resin temperature of 270° C. and a mold temperature of 80° C. to prepare a test specimen having a diameter of 50 mmφ and a thickness of 3 mm.

The thus-prepared test specimens were exposed to 25 kGy of a cobalt-60 gamma radiation and then they were measured for the change in yellowness index (ΔYI) thereof. The measurements of the yellowness index of the test specimens were carried out according to JIS K7103 by using a color difference meter (SM-3-CH, manufactured by SUGA Test Instruments Co., Ltd). The results are also shown in Table 5.

TABLE 5

| Example No. | Aromatic compound containing oxy group or carbonyl group/compound containing sulfonate group | Blending ratio (part by weight) | ΔYI |
|---|---|---|---|
| Example 20 | dibenzyl ketone/phenyl toluene-sulfonate | 0.5/0.5 | 9.2 |
| Example 21 | dibenzyl ether/methyl toluene-sulfonate | 0.25/0.25 | 8.0 |
| Example 22 | dibenzyl ether/2-methoxyethyl toluene-sulfonate | 0.5/0.5 | 3.9 |
| Example 23 | benzyl benzoate/methyl toluene-sulfonate | 0.5/1.0 | 9.1 |
| Example 24 | 1,2-dibenzyloxy ethane/2-methoxyethyl toluene-sulfonate | 0.5/0.5 | 4.3 |
| Example 25 | dicyclohexyl phthalate/phenyl toluene-sulfonate | 0.5/0.75 | 8.8 |
| Example 26 | dibenzoyl methane/1,2-bis-tosyloxy ethane | 0.5/0.5 | 9.3 |
| Comparative Example 8 | -/methyl toluene-sulfonate | -/0.5 | 14.5 |

Examples 27 to 33 and Comparative Example 9

An aromatic compound containing oxy group or carbonyl group and an aromatic hydrocarbon-aldehyde resin both shown in Table 6 were blended, at blending ratios also shown in Table 6, with 100 parts by weight of a polycarbonate resin in a tumbler. The mixture was fed into a vented single-screw extruder having a screw diameter of 40 mmφ and extruded into pellets at a barrel temperature of 270° C.

Specifically, the raw materials used in this example were as follows.

(1) Polycarbonate resin:

Iupiron S-2000 having a viscosity-average molecular weight of 25,000, produced by Mitsubishi Engineering Plastics Co., Ltd.

(2) Aromatic hydrocarbon-aldehyde resin:

NIKANOL DS produced by Mitsubishi Gas Chemical Co., Ltd., from which no acetal group was detected;

NIKANOL L produced by Mitsubishi Gas Chemical Co., Ltd. and having an oxygen content of 10% by weight; or NIKANOL Y-50 produced by Mitsubishi Gas Chemical Co., Ltd. and having an oxygen content of 18% by weight.

The thus-prepared pellets were dried in a hot-air drier at a temperature of 120° C. for not less than 5 hours. Thereafter, the dried pellets were injection-molded at a resin temperature of 270° C. and a mold temperature of 80° C. to prepare a test specimen having a diameter of 50 mmφ and a thickness of 3 mm.

The thus-prepared test specimens were exposed to 25 kGy of a cobalt-60 gamma radiation and then they were measured for the change in yellowness index (ΔYI) thereof. The measurements of the yellowness index of the test specimens were carried out according to JIS K7103 by using a color difference meter (SM- 3-CH, manufactured by SUGA Test Instruments Co., Ltd). The results are also shown in Table 6.

TABLE 6

| Example No. | Aromatic compound containing oxy group or carbonyl group/aromatic hydrocarbon-aldehyde resin | Blending ratio (part by weight) | ΔYI |
|---|---|---|---|
| Example 27 | dibenzyl ether/NIKANOL-Y-50 | 0.5/0.5 | 8.2 |
| Example 28 | dibenzyl ketone/NIKANOL-Y-50 | 0.5/0.5 | 8.9 |
| Example 29 | 1,4-bis-methoxymethyl benzene/NIKANOL-Y-50 | 0.5/0.5 | 7.2 |
| Example 30 | 1,2-dibenzyloxy ethane/NIKANOL-Y-50 | 0.5/0.5 | 8.6 |
| Example 31 | hydroquinone-dibenzyl ether/NIKANOL-L | 0.5/0.75 | 8.7 |
| Example 32 | benzyl benzoate/NIKANOL-L | 0.25/0.5 | 9.5 |
| Example 33 | dibenzoyl methane/NIKANOL-DS | 0.5/0.25 | 9.3 |
| Comparative Example 9 | -/NIKANOL-DS | -/1.0 | 10.0 |

Examples 34 to 39 and Comparative Example 10

An aromatic compound containing oxy group or carbonyl group, a compound containing cyclic acetal group and a polyalkylene glycol derivative shown in Table 7 were blended, at blending ratios also shown in Table 7, with 100 parts by weight of a polycarbonate resin in a tumbler. The mixture was fed into a vented single-screw extruder having a screw diameter of 40 mmφ and extruded into pellets at a barrel temperature of 270° C.

Specifically, the raw materials used in this example were as follows.

(1) Polycarbonate resin:

Tupiron S-2000 having a viscosity-average molecular weight of 25,000, produced by Mitsubishi Engineering Plastics Co., Ltd.

(2) Polyalkylene glycol derivative:

PEG1000: polyethylene glycol having an average molecular weight of 1,000,

PPG2000: polypropylene glycol having an average molecular weight of 2,000, or

PPGST30: polypropylene glycol-distearate having an average molecular weight of 3,000.

The pellets were then dried in a hot-air drier at a temperature of 120° C. for not less than 5 hours. Thereafter, the dried pellets were injection-molded at a resin temperature of 270° C. and a mold temperature of 80° C. to prepare a test specimen having a diameter of 50 mmφ and a thickness of 3 mm.

The thus-prepared test specimens were exposed to 25 kGy of a cobalt-60 gamma radiation and then they were measured for the change in yellowness index (ΔYI) thereof. The measurements of the yellowness index of the test specimens were carried out according to JIS K7103 by using a color difference meter (SM-3-CH, manufactured by SUGA Test Instruments Co., Ltd).

Furthermore, the dried pellets prepared above were injection-molded at a resin temperature of 270° C. and a mold temperature of 80° C. under an internal mold pressure of 550 Kg/cm² to form a cup-like molded product. The molded product was removed from the mold to evaluate mold-release properties thereof and measure a mold release resistance (kg) thereof. The results are also shown in Table 7.

TABLE 7

| Example No. | Aromatic compound containing oxy group or carbonyl group/compound containing cyclic acetal group/polyalkylene glycol derivative | Blending ratio (part by weight) | ΔYI | Mold-release properties | Mold release resistance (Kg) |
|---|---|---|---|---|---|
| Example 34 | benzyl benzoate/2-benzyl-1,3-dioxolane/PEG1000 | 0.25/0.25/0.25 | 9.4 | good | 492 |
| Example 35 | dibenzyl ether/2-benzyl-1,3-dioxolane/PPG2000 | 0.2/0.2/0.2 | 8.3 | good | 503 |
| Example 36 | benzoin/2,2'-trimethylene bis-1,3-dioxolane/PPGST30 | 0.25/0.5/0.5 | 7.8 | good | 435 |
| Example 37 | dibenzyl ether/2-methoxy-1,3-dioxolane/PPG2000 | 0.5/0.5/0.25 | 8.7 | good | 490 |
| Example 38 | 1,2-dibenzyloxy ethane/2-benzyl-4-methyl-1,3-dioxolane/PPGST30 | 0.5/0.25/0.25 | 8.2 | good | 488 |
| Example 39 | dicyclohexyl phthalate/4-phenyl 1,3-dioxane/PEG1000 | 0.2/0.2/0.5 | 9.2 | good | 439 |
| Comparative Example 10 | Not added | — | 18.1 | bad | 810 |

What is claimed is:

1. A polycarbonate resin composition comprising:
   100 parts by weight of a polycarbonate resin;
   0.01 to 5 parts by weight of an aromatic compound containing an oxy group or a. carbonyl group; and
   0.01 to 5 parts by weight of a compound containing a cyclic acetal group,
   said compound containing a cyclic acetal group being represented by the following general formulae (III) or (IV):

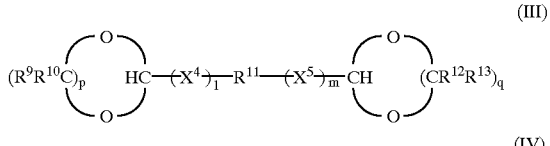

(III)

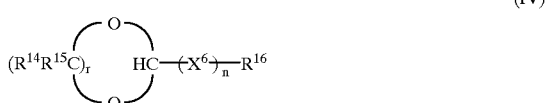

(IV)

where $R^9$, $R^{10}$, $R^{12}$, $R^{13}$, $R^{14}$, and $R^{15}$ are independently a hydrogen atom, a $(C_1-C_{10})$alkyl group, $-CH_2OH$, $-COOCH_3$, a phenyl group or a halogen atom; $R^{11}$ is a $(C_1-C_{15})$alkylene group, a $(C_2-C_{15})$alkenylene group or a $(C_6-C_{30})$arylene group, in which said arylene group may have substituent group(s) bonded to the aromatic ring thereof, the substituent group(s) being a $(C_1-C_{10})$alkyl group or a halogen atom; $R^{16}$ is a hydrogen atom, a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, a $(C_1-C_{30})$alkoxy$(C_1-C_{30})$alkyl group, a $(C_1-C_{30})$acyl group, a $(C_6-C_{30})$aryl$(C_1-C_{30})$acyl group, a halogen atom, a halogenated $(C_1-C_{30})$alkyl group, an amino group or an aminated $(C_1-C_{30})$alkyl group, in which said aryl group, said arylalkyl group, said arylalkenyl group or said arylacyl group may have substituent group(s) bonded to the aromatic ring thereof, the substituent group(s) being a ($C_1$–$C_{10}$)alkyl group or a halogen atom; $X^4$, $X^5$ and $X^6$ are independently —$CHR^{17}$—, —O—, —NH— or —PH— where $R^{17}$ is a hydrogen atom, a ($C_1$–$C_{15}$)alkyl group or a ($C_6$–$C_{30}$) aryl group; l and m are independently an integer of 0 or 1; n is 1; and p, q and r are independently an integer of 1 to 10, and if p, q or r is not less than 2, then two or more of each of $R^9$, $R^{10}$, $R^{12}$ and $R^{13}$ in the general formula (III), and $R^{14}$ and $R^{15}$ in the general formula (IV) may be the same or different.

2. The polycarbonate resin composition of claim 1, wherein said aromatic compound containing an oxy group or a carbonyl group is represented by the following general formulae (I) or (II):

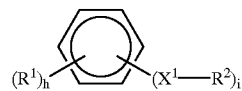
(I)

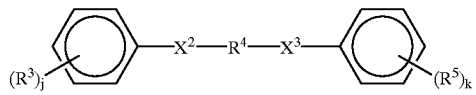
(II)

where $R^1$, $R^3$, and $R^5$ are independently a ($C_1$–$C_{10}$) alkyl group, a ($C_1$–$C_{10}$) alkoxy group, a ($C_1$–$C_{10}$) alkoxy ($C_1$–$C_{10}$) alkyl group, a ($C_6$–$C_{16}$) aryl ($C_1$–$C_{10}$) alkoxy ($C_1$–$C_{10}$) alkyl group, —$CH_2OH$ or a halogen atom; $R^4$ is a ($C_1$–$C_{15}$) alkylene group, a ($C_2$–$C_{15}$) alkenylene group, a ($C_6$–$C_{30}$) arylene group, a ($C_1$–$C_{15}$) alkylene-dioxy group, or a ($C_6$–$C_{30}$) arlyene-di ($C_1$–$C_{15}$) alkylene-oxy group, in which said arylene group or said arylene-dialkylene-oxy group may have substituent group(s) bonded to the aromatic ring thereof, the substituent group(s) being a ($C_1$–$C_{10}$) alkyl group or a halogen atom; $X^1$, $X^2$, and $X^3$ are independently —O—, —$CHR^6$—O—, —CO—, —$CHR^7$—CO—, —CO—CO— or —CO—$C(OR^8)_2$—; $R^2$, $R^6$, $R^7$, and $R^8$ are independently a hydrogen atom, a ($C_1$–$C_{30}$) alkyl group, a ($C_3$–$C_{30}$) cycloalkyl group, a ($C_2$–$C_{30}$) alkenyl group, a ($C_6$–$C_{30}$) aryl group, a ($C_6$–$C_{30}$) aryl ($C_1$–$C_{30}$) alkyl group, a ($C_6$–$C_{30}$) aryl ($C_2$–$C_{30}$) alkenyl group, a hydroxy group, a ($C_1$–$C_{30}$) alkoxy group, a ($C_6$–$C_{30}$) aryl ($C_1$–$C_{30}$) alkoxy group, a ($C_6$–$C_{30}$) aryl ($C_1$–$C_{30}$) alkyl ($C_1$–$C_{30}$) alkoxy group, a ($C_1$–$C_{30}$) acyl group or a ($C_6$–$C_{30}$) aryl ($C_1$–$C_{30}$) acyl group in which said aryl group, said arylalkyl group, said arylalkenyl group, said arylalkoxy group, said arylalkylalkoxy group or said arylacyl group may have substituent group(s) bonded to the aromatic ring thereof, the substituent group(s) being a ($C_1$–$C_{10}$) alkyl group or a halogen atom; and h, j, and k are independently an integer of 0 to 5 and i is an integer of 1 to 6 with the proviso that the sum of h and i is in the range of 1 to 6, and if i is an integer not less than 2, the $R^2$'s contained in the substituent groups bonded to the same aromatic ring may be covalently bonded to each other.

3. A polycarbonate resin composition comprising:

100 parts by weight of a polycarbonate resin;

0.01 to 5 parts by weight of an aromatic compound containing an oxy group or a carbonyl group;

0.01 to 5 parts by weight of a compound containing a cyclic acetal group; and 0.01 to 5% by weight of a polyalkylene glycol, an ether of polyalkylene glycol, or an ester of polyalkylene glycol.

4. The polycarbonate resin composition of claim 3, wherein said polyalkylene glycol, said ether of polyalkylene glycol or said ester of polyalkylene glycol is represented by the general formulae (XI) or (XII):

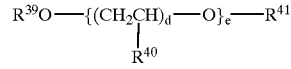
(XI)

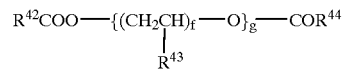
(XII)

where $R^{39}$, $R^{41}$, $R^{42}$, and $R^{44}$ are independently a hydrogen atom, a ($C_1$–$C_{30}$) alkyl group, a ($C_3$–$C_{30}$) cycloalkyl group, a ($C_2$–$C_{30}$) alkenyl group, a ($C_6$–$C_{30}$) aryl group, a ($C_6$–$C_{30}$) aryl ($C_1$–$C_{30}$) alkyl group or a ($C_6$–$C_{30}$) aryl ($C_2$–$C_{30}$) alkenyl group, in which said aryl group, said arylalkyl group, and said arylalkenyl group may have substituent group(s) bonded to the aromatic ring thereof, the substituent group(s) being a ($C_1$–$C_{10}$) alkyl group or a halogen atom; $R^{40}$ and $R^{43}$ are independently a hydrogen atom or a ($C_1$–$C_4$) alkyl group; e and g are independently an integer of not less than 1, and d and f are independently an integer of 1 to 10.

5. The polycarbonate resin composition of claim 4, wherein e and g are independently an integer from 1 to 1000.

* * * * *